United States Patent Office 2,711,431
Patented June 21, 1955

2,711,431

PREPARATION OF PENTAERYTHRITOL

Leonard E. Cadwell, Springdale, and Alfred F. Schmutzler, Stamford, Conn., assignors to American Cyanamid Company, New York, N. Y., a corporation of Maine No Drawing. Application October 26, 1953,
Serial No. 388,430

4 Claims. (Cl. 260—635)

The invention in this case relates to a process for producing pentaerythritol and, more particularly, the invention in this case relates to a process for producing pentaerythritol comprising reacting lactonitrile and formaldehyde under alkaline conditions.

One of the objects of the present invention is to produce pentaerythritol by reacting lactonitrile with an aqueous solution of formaldehyde under alkaline conditions. A further object of the present invention is to produce pentaerythritol by a very economical process which utilizes a readily available raw material, namely lactonitrile. These and other objects of the present invention will be discussed more fully hereinbelow.

The process of the present invention may be carried out by adjusting the pH of an aqueous solution of formaldehyde to above 7 and up to about 12 and preferably between about 8 and 11. The lactonitrile is then added to the alkaline solution of formaldehyde gradually and with constant stirring of the reaction mixture. The temperature of the reaction mixture is maintained by cooling, if necessary, to avoid overheating due to exothermic reaction at a temperature between 0° C. and 60° C., and preferably between about 15° C. and 35° C. The pH of the reaction mixture should be controlled during the addition of the lactonitrile and after the addition has been completed, but while reaction is still taking place on the alkaline side such as above 7 and not significantly higher than 12. The adjustment of the pH prior to, during and after the addition of the lactonitrile can be accomplished by the addition to the sphere of reaction any of the conventional alkalizing materials such as sodium hydroxide, lithium hydroxide, magnesium hydroxide, calcium hydroxide, barium hydroxide, water soluble tertiary amines, quaternary amines, potassium hydroxide, ammonium hydroxide and the like. The reaction of the lactonitrile with the formaldehyde is exothermic and, as a consequence, it is generally desired to cool the alkalized aqueous solution of formaldehyde to a temperature of about 10–25° C. in order that the temperature of reaction may be more readily controlled. The temperature of reaction may be controlled by using an ice-bath or other cooling medium. After the reaction is substantially complete as indicated by the termination of the exothermic conditions, the reaction mixture may be heated to 60° C., if desired, and then neutralized to a pH of 7 to about 8 and preferably 7.2 to about 7.6. The water is removed from the sphere of reaction by evaporation and when substantially all of the water is removed, the remaining reaction product is cooled gradually in order to obtain crystals of large particle size. The cooled reaction product is allowed to stand overnight and is then filtered to produce crystalline pentaerythritol. If it is desired to purify the product, it may be redissolved in hot water and cooled gradually again, whereby the crystals of pentaerythritol separate from the solution in a substantially pure form.

In order that the present invention may be more completely understood, the following example is set forth in which all parts are parts by weight. This example is set forth primarily for the purpose of illustration and any specific enumeration of detail contained therein should not be interpreted as a limitation on the case except as is indicated in the appended claims.

Example 1

1830 parts of formalin (an aqueous solution containing 37% formaldehyde) are alkalized with 800 parts of a 50% sodium hydroxide solution and the alkalized formaldehyde is cooled to a temperature of about 15–20° C. 355 parts of lactonitrile are added gradually with constant stirring while maintaining the temperature below 30° C. After all of the lactonitrile has been added and the reaction is apparently completed as indicated by the cessation of exothermic activity the reaction mixture is gradually heated to about 60° C. and sufficient acid materials are added to the solution to a pH of about 7.5. The resulting neutralized solution is concentrated by the evaporation of water to produce a supersaturated solution. During gradual cooling, the pentaerythritol crystallizes from the solution in fairly large particles. The cooled solution is permitted to stand overnight, whereupon it is filtered and the crystals of pentaerythritol are recovered.

The lactonitrile and formaldehyde are generally present in the sphere of reaction in at least stoichiometric proportions (1 mol of lactonitrile to 4 mols of formaldehyde), but for best yields, a 10% excess of formaldehyde should be used.

In the place of formaldehyde, one may make use of materials engendering formaldehyde such as hexamethylene tetramine, dioxane, paraformaldehyde, trioxymethylene, paraldehyde and the like.

We claim:

1. A process for producing pentaerythritol comprising introducing lactonitrile gradually into an alkaline aqueous solution of formaldehyde at a temperature between 0° C. and 60° C., with constant stirring, while maintaining a pH of above 7 to about 12 until reaction is substantially complete, neutralizing the reaction product and evaporating the water therefrom to crystallize the pentaerythritol.

2. A process for producing pentaerythritol comprising introducing lactonitrile gradually into an alkaline aqueous solution of formaldehyde at a temperature between 15° C. and 35° C., with constant stirring, while maintaining a pH of above 7 to about 12 until reaction is substantially complete, neutralizing the reaction product and evaporating the water therefrom to crystallize the pentaerythritol.

3. A process for producing pentaerythritol comprising introducing lactonitrile gradually into an alkaline aqueous solution of formaldehyde at a temperature between 0° C. and 60° C., with constant stirring, while maintaining a pH of 8 to 11 until reaction is substantially complete, neutralizing the reaction product and evaporating the water therefrom to crystallize the pentaerythritol.

4. A process for producing pentaerythritol comprising introducing lactonitrile gradually into an alkaline aqueous solution of formaldehyde at a temperature between 15° C. and 35° C., with constant stirring, while maintaining a pH of 8 to 11 until reaction is substantially complete, neutralizing the reaction product and evaporating the water therefrom to crystallize the pentaerythritol.

References Cited in the file of this patent

UNITED STATES PATENTS 2,541,350    Gilbert _____ Feb. 13, 1951